US011725477B2

(12) United States Patent
Frost et al.

(10) Patent No.: US 11,725,477 B2
(45) Date of Patent: Aug. 15, 2023

(54) CHEMICAL FILTER BYPASS TOOL AND ASSOCIATED METHODS

(71) Applicant: ODESSA SEPARATOR, INC., Odessa, TX (US)

(72) Inventors: Cavin Bert Frost, Odessa, TX (US); Lowell C. Kirkland, Odessa, TX (US); Timothy S. Vestal, Odessa, TX (US); Andres J. Perez, Odessa, TX (US); Daniela A. Sanchez-Rodriguez, Bogotá (CO); Mark H. Lowe, Odessa, TX (US)

(73) Assignee: Odessa Separator, Inc., Odessa, TX (US)

( * ) Notice: Subject to any disclaimer, the term of this patent is extended or adjusted under 35 U.S.C. 154(b) by 399 days.

(21) Appl. No.: 16/916,493

(22) Filed: Jun. 30, 2020

(65) Prior Publication Data

US 2021/0025260 A1 Jan. 28, 2021

Related U.S. Application Data

(60) Provisional application No. 62/878,699, filed on Jul. 25, 2019.

(51) Int. Cl.
| | |
|---|---|
| *E21B 34/08* | (2006.01) |
| *B01D 35/147* | (2006.01) |
| *E21B 43/08* | (2006.01) |
| *B01D 29/13* | (2006.01) |
| *B01D 35/02* | (2006.01) |

(52) U.S. Cl.
CPC ............. *E21B 34/08* (2013.01); *B01D 29/13* (2013.01); *B01D 35/02* (2013.01); *B01D 35/147* (2013.01); *E21B 43/08* (2013.01)

(58) Field of Classification Search
CPC ......... E21B 34/08; E21B 43/08; B01D 29/13; B01D 35/02; B01D 35/147; B01D 29/15; B01D 29/54
See application file for complete search history.

(56) References Cited

U.S. PATENT DOCUMENTS

| | | | |
|---|---|---|---|
| 5,374,355 A | * 12/1994 | Habiger | ................. B01D 29/15 210/DIG. 17 |
| 8,596,366 B2 | 12/2013 | Franklin et al. | |
| 9,187,991 B2 | 11/2015 | Fripp et al. | |
| 9,428,989 B2 | 8/2016 | Aitken et al. | |
| 2009/0288838 A1 | 11/2009 | Richards | |

* cited by examiner

*Primary Examiner* — Waqaas Ali
(74) *Attorney, Agent, or Firm* — Smith IP Services, P.C.

(57) ABSTRACT

A filter bypass tool for use in a subterranean well can include an inner tube having a flow passage extending longitudinally through the inner tube, a pipe surrounding the inner tube, with an annulus formed radially between the pipe and the inner tube, the pipe being perforated to permit fluid communication between the annulus and an exterior of the pipe, and a bypass valve having closed and open configurations. In the closed configuration the bypass valve blocks fluid flow from the annulus to the flow passage. In the open configuration the bypass valve permits fluid flow from the annulus to the flow passage. The bypass valve is configured to open in response to a predetermined pressure differential from the annulus to the flow passage.

8 Claims, 5 Drawing Sheets

CHEMICAL FILTER BYPASS TOOL AND ASSOCIATED METHODS

BACKGROUND

This disclosure relates generally to equipment utilized and operations performed in conjunction with a subterranean well and, in an example described below, more particularly provides a chemical filter bypass tool and associated methods.

Hydrocarbon wells can suffer from many problems, and an entire industry has developed to attempt to alleviate them. Downhole equipment including artificial lift pumps, tubing, sucker rods, etc., are damaged and destroyed by corrosion, paraffin, scale and sand. In addition to damage to expensive equipment and the high cost of pulling completions to make repairs, production volumes are greatly decreased or even lost completely.

In some wells, it may not be economically viable to purchase numerous stand-alone tools to improve well performance. Also, many low production wells and shallow wells have limited space at bottom (known to those skilled in the art as "rathole") to accommodate a long string of tools.

One of the most destructive threats to downhole equipment is sand. The sand may be naturally occurring formation sand or sand used in a hydraulic fracturing process.

Therefore, it will be readily appreciated that improvements are continually needed in the art of alleviating problems associated with well production. It is among the objects of the present disclosure to provide such improvements to the art.

DETAILED DESCRIPTION

Figure 1:
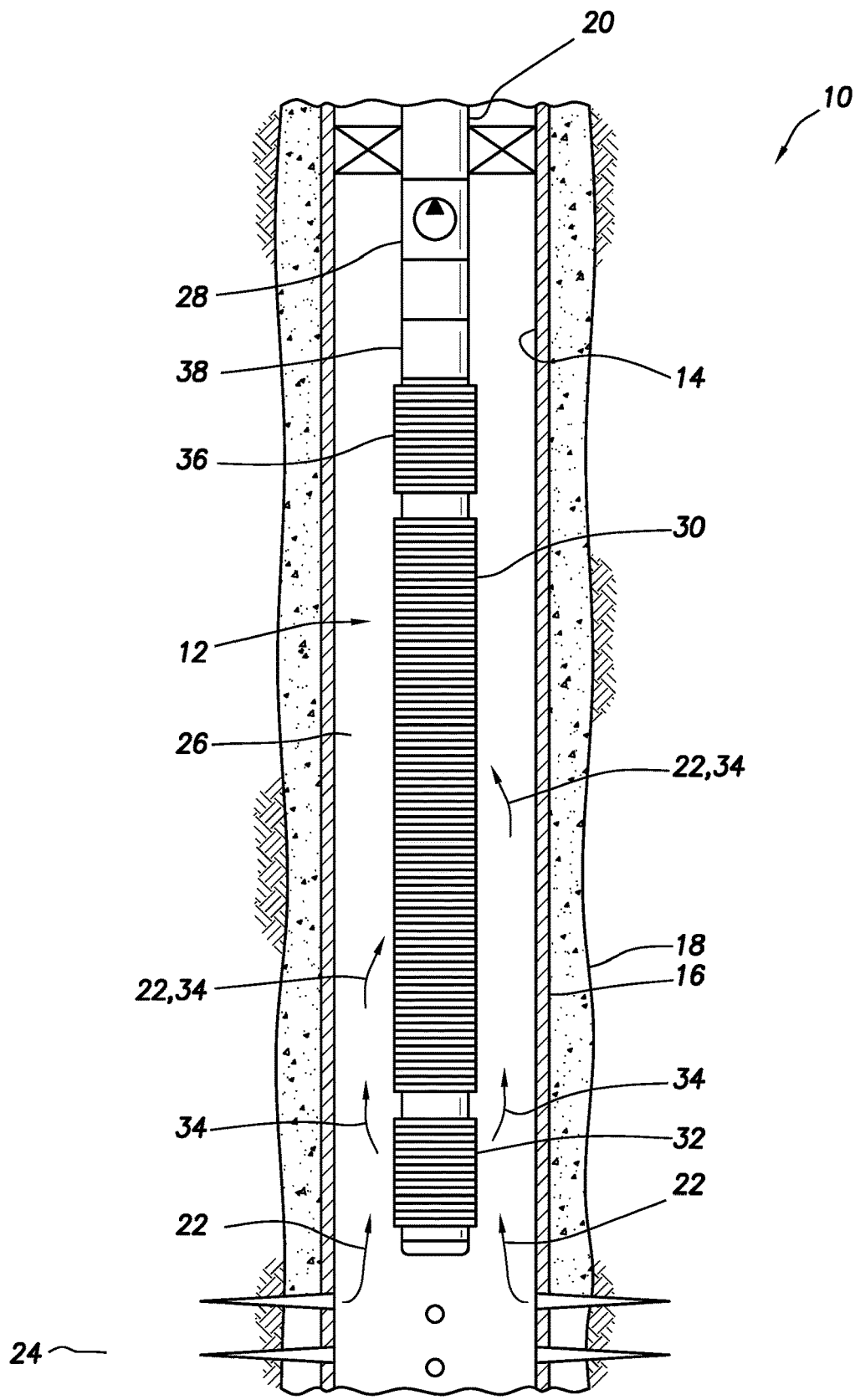
FIG. 1 is a representative partially cross-sectional view of an example of a well system and associated method which can embody principles of this disclosure.

Representatively illustrated in FIG. 1 is a system 10 for use with a subterranean well, and an associated method, which can embody the principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a bottom hole assembly 12 is positioned in a generally vertical wellbore 14. The wellbore 14 is lined with casing 16 and cement 18. In other examples, the bottom hole assembly 12 could be positioned in an uncased or open hole section of a generally horizontal or otherwise inclined wellbore section.

The bottom hole assembly 12 is "bottom hole" in that it is connected at or near a downhole end of a tubular string 20 (for example, made up of production tubing) installed in the wellbore 14. Thus, it is not necessary for the bottom hole assembly 12 to be positioned at or near a "bottom" of the wellbore 14.

The bottom hole assembly 12 is used in the production of fluid 22 into the tubular string 20. In this example, the fluid 22 flows into the wellbore 14 from an earth formation 24 penetrated by the wellbore. The fluid 22 flows into an annulus 26 formed between the bottom hole assembly 12 and the wellbore 14, then into the bottom hole assembly, and then to surface via the tubular string 20.

A downhole pump 28 may be used in some examples to assist in flowing the fluid 22 to the surface through the tubular string 20. Any of various different types of pumps (such as, a reciprocating rod pump or an electric submersible pump, etc.) may be used for the pump 28. The scope of this disclosure is not limited to use of any particular type of pump, or to use of a pump at all.

In order to prevent damage to the pump 28 or to surface equipment, or for other purposes, the bottom hole assembly 12 includes a filter 30. The filter 30 filters the fluid 22 as it flows into the bottom hole assembly 12. The filter 30 may be any type of filter (such as, a wire-wrapped or columnar vee-type filter, a wire mesh screen, a slotted pipe, etc.). The scope of this disclosure is not limited to use of any particular type of filter.

In this example, it is desired for the fluid 22 to be treated prior to its production to the surface via the tubular string 20. For this purpose, the bottom hole assembly 12 includes another filter 32. The filter 32 allows a chemical treatment 34 to flow out of the bottom hole assembly 12 and into the annulus 26, where it mixes with the fluid 22. The mixed fluid 22 and chemical treatment 34 can then flow into the bottom hole assembly 12.

The chemical treatment 34 may serve any of a variety of different purposes. These purposes may include (but are not limited to) corrosion or scale prevention, paraffin mitigation, cleaning, surfactant, etc. The scope of this disclosure is not limited to any particular type of chemical treatment, or to use of a chemical treatment at all.

Over time, the filter 30 used to filter the fluid 22 flowing into the bottom hole assembly 12 may become clogged or plugged with debris, formation fines, sand, etc., so that flow through the filter 30 is substantially restricted or completely prevented. In order to provide for continued flow of the fluid 22 into the tubular string 20, even though the filter 30 is plugged, the bottom hole assembly 12 includes a filter bypass tool 38 including yet another filter 36.

The filter 36 presents minimal or no restriction to flow of the fluid 22 into the bottom hole assembly 12. However, the filter bypass tool 38 prevents flow of the fluid 22 into the bottom hole assembly 12 via the filter 36, until the flow through the filter 30 is sufficiently plugged. Thus, the filter bypass tool 38 allows the fluid 22 to bypass the filter 30 when flow through the filter 30 has become unacceptably restricted.

Figure 2:
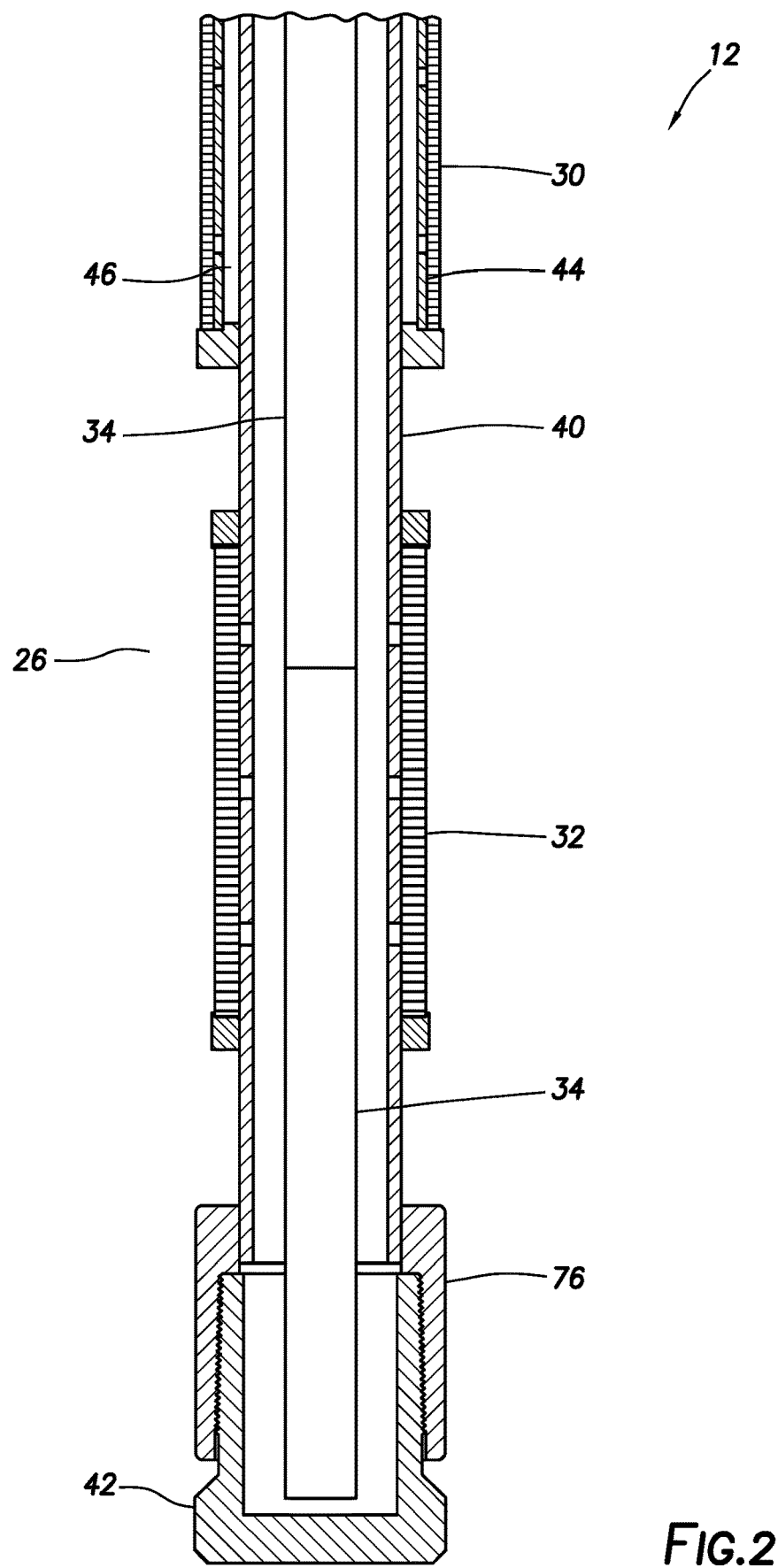
FIG. 2 is a representative cross-sectional view of an example of a section of a bottom hole assembly that may be used in the FIG. 1 system and method, and which can embody the principles of this disclosure.

Referring additionally now to FIG. 2, a cross-sectional view of an example of a lower section of the bottom hole assembly 12 is representatively illustrated. The bottom hole assembly 12 may be used with the system 10 and method of FIG. 1, or it may be used with other systems and methods.

For convenience, the bottom hole assembly 12 is described further below as it may be used with the FIG. 1 system 10 and method.

In the FIG. 2 example, the filter 32 overlies a base pipe or inner tubular 40. The chemical treatment 34 in solid form is initially contained within the inner tubular 40. When the bottom hole assembly 12 is positioned in the wellbore 14, the fluid 22 contacts and slowly dissolves the chemical treatment 34, so that it flows outward from an interior of the inner tubular 40 to the annulus 26.

Note that it is not necessary for the filter 32 and the inner tubular 40 to be separate components of the bottom hole assembly 12. In other examples, the filter 32 could be formed as part of the inner tubular 40, such as, in the form of narrow slots or small perforations in the inner tubular. Thus, the scope of this disclosure is not limited to any particular details of the bottom hole assembly 12 as described herein or depicted in the drawings.

The filter 32 filters the flow of the fluid 22 and dissolved chemical treatment 34 from the interior of the inner tubular 40 to the annulus 26, while retaining the solid chemical treatment in the inner tubular. In the FIG. 2 example, the inner tubular 40 is perforated in a section of the inner tubular that underlies the filter 32.

At a lower end (as viewed in FIG. 2) of the inner tubular 40, a bull plug 42 retains the solid chemical treatment 34 in the interior of the inner tubular. An upper end (as viewed in FIG. 2) of the inner tubular 40 extends into the filter 30.

The filter 30 overlies a perforated base pipe 44. An annulus 46 is formed radially between the base pipe 44 and the inner tubular 40. In the FIG. 1 system 10 and method, the fluid 22 can flow from the annulus 26, through the filter 30 and base pipe 44, and then into the annulus 46.

Figure 3:
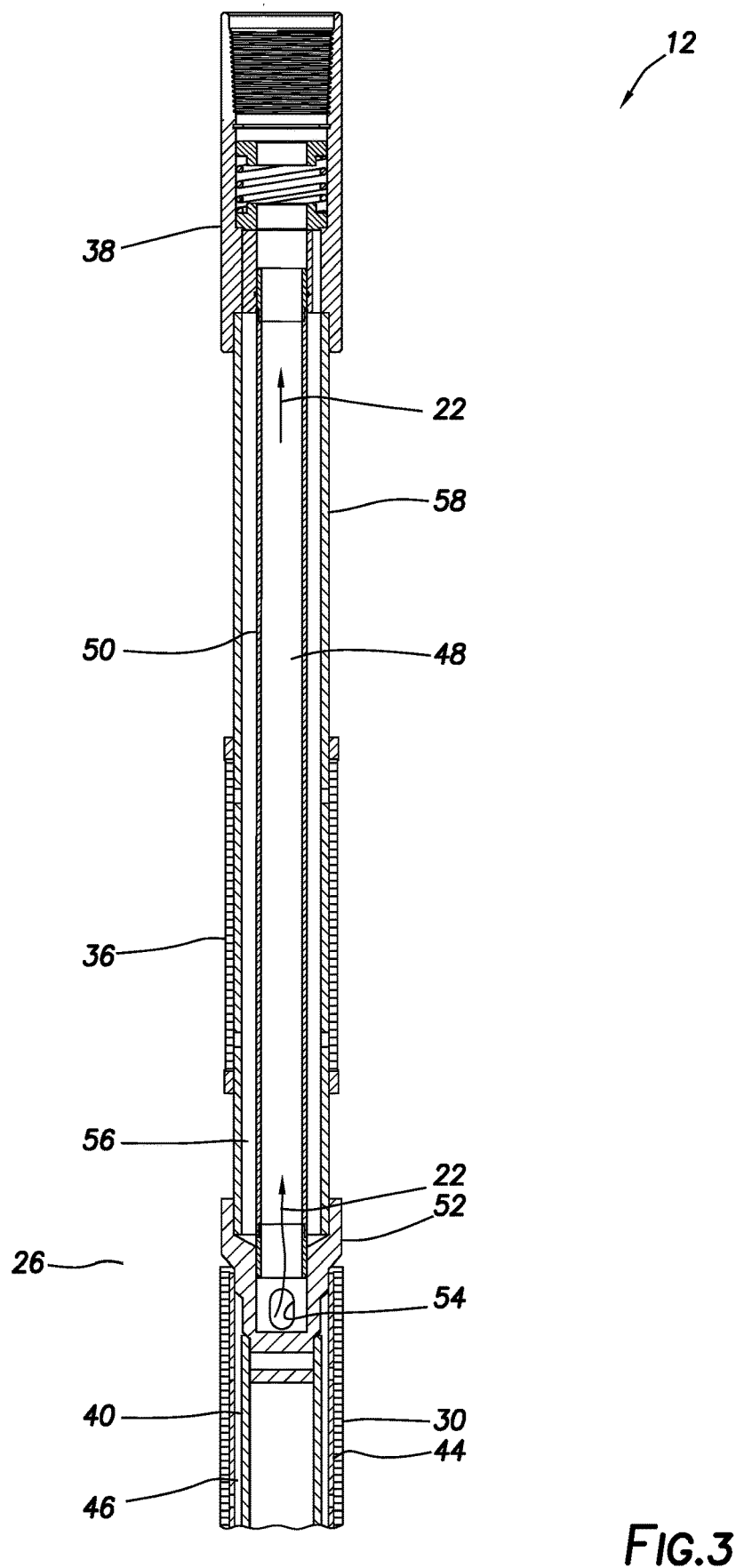
FIG. 3 is a representative cross-sectional view of an example of another section of the bottom hole assembly.

Referring additionally now to FIG. 3, a cross-sectional view of an example of an upper section of the bottom hole assembly 12 is representatively illustrated. In this view, it may be seen that the fluid 22 can flow from the annulus 46 and into a flow passage 48 formed through an inner tube 50. A lower end of the inner tube 50 is sealingly received in a flow adapter 52.

The flow adapter 52 provides fluid communication between the annulus 46 and the flow passage 48 via one or more ports 54 positioned longitudinally between the inner tubular 40 and the inner tube 50. The flow adapter 52 also closes off an upper end of the inner tubular 40, and closes off a lower end of an annulus 56 formed radially between the inner tube 50 and a base pipe 58.

The base pipe 58 is connected between the flow adapter 52 and the filter bypass tool 38. A section of the base pipe 58 which underlies the filter 36 is perforated to provide for flow of the fluid 22 from the annulus 26 into the annulus 56. However, until flow through the filter 30 is sufficiently restricted, the filter bypass tool 38 prevents the fluid 22 from flowing from the annulus 56 into the flow passage 48.

Figure 4:
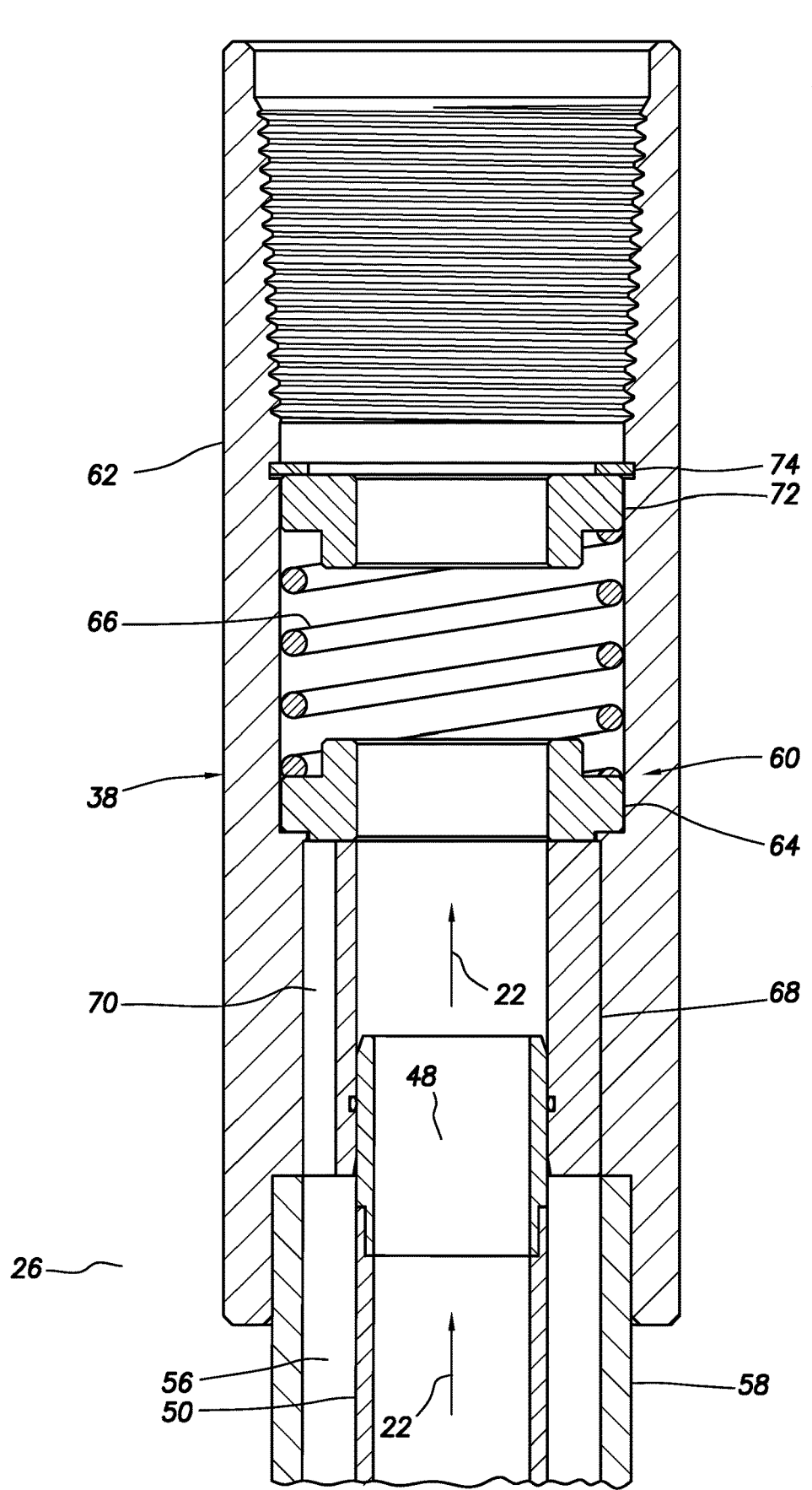
FIG. 4 is a representative cross-sectional view of an example of a filter bypass tool that may be used in the FIG. 3 bottom hole assembly section, and which can embody the principles of this disclosure, the filter bypass tool being depicted in a closed configuration.

Referring additionally now to FIG. 4, a cross-sectional view of the filter bypass tool 38 is representatively illustrated. In this view, the filter bypass tool 38 is in a closed configuration, in which flow from the annulus 56 to the flow passage 48 is prevented by a bypass valve 60 of the filter bypass tool 38.

The bypass valve 60 is contained within an outer housing 62 of the filter bypass tool 38. In this example, an upper end of the outer housing 62 is internally threaded for connection to a lower end of the tubular string 20 in the FIG. 1 system 10. When connected to the tubular string 20, the flow passage 48 extends upwardly through the tubular string and components thereof (such as, an inlet of the pump 28). A lower end of the outer housing 62 is connected to an upper end of the pipe 58.

The bypass valve 60 includes an annular shaped closure member 64. A bias member 66 (such as, a coiled compression spring, an elastomer, a compressed gas chamber, etc.) biases the closure member 64 into sealing contact with a sleeve 68 positioned between the closure member and the annulus 56. The inner tube 50 is sealingly received in the sleeve 68.

Note that it is not necessary for the closure member 64 to completely seal against the sleeve 68 in the closed configuration. In some examples, it is sufficient for the closure member 64 to substantially block flow through a bypass flow path 70 formed longitudinally through the sleeve 68.

As depicted in FIG. 4, the bias member 66 is positioned between the closure member 64 and an annular shaped spring retainer 72. A snap ring 74 secures the spring retainer 72 in the outer housing 62, so that compression of the bias member 66 is maintained.

Figure 5:
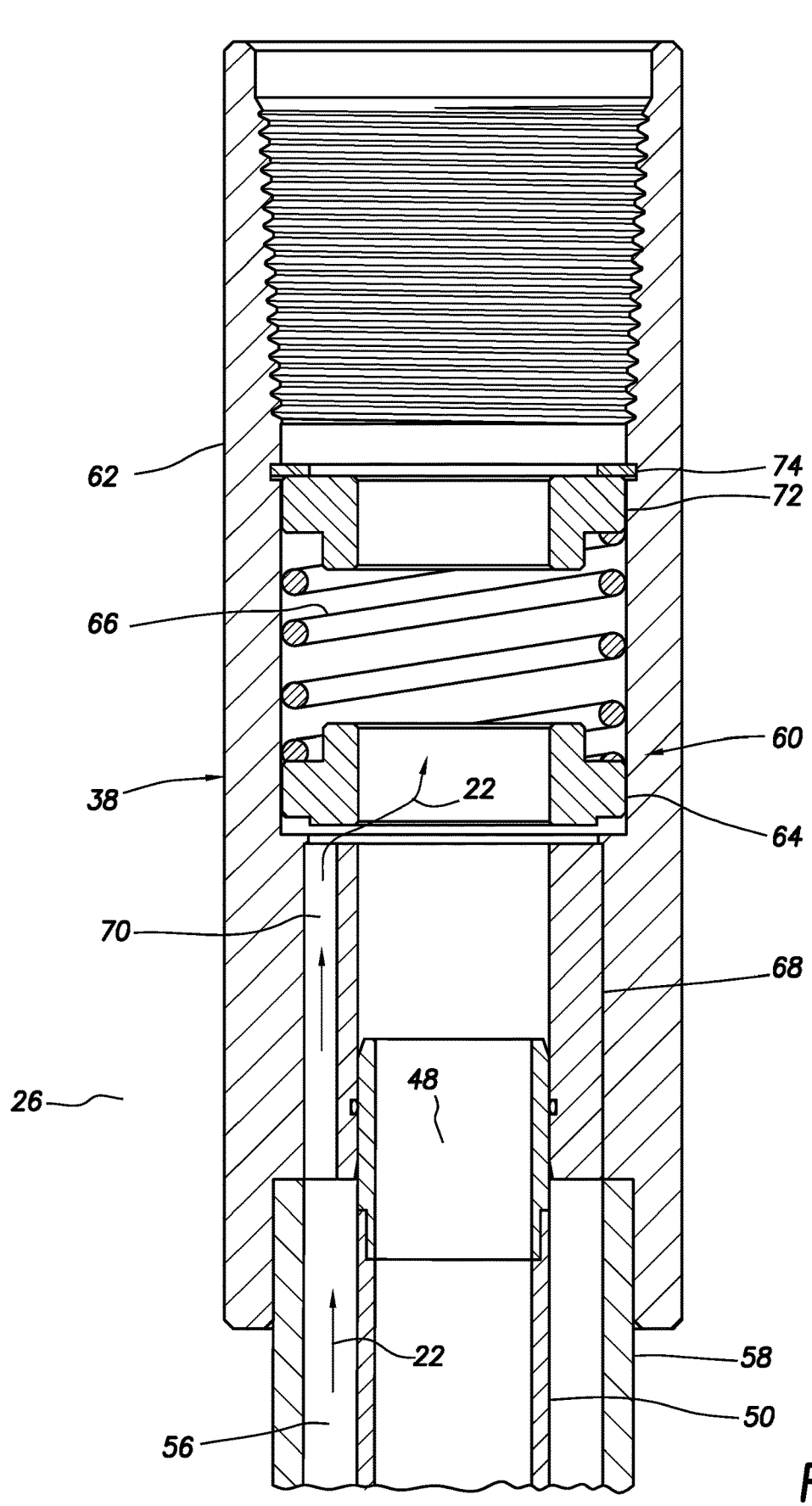
FIG. 5 is a representative cross-sectional view of the filter bypass tool in an open configuration.

Referring additionally now to FIG. 5, another cross-sectional view of the filter bypass tool 38 is representatively illustrated. In this view, the filter bypass tool 38 is in an open configuration.

The bypass valve 60 opens when flow through the filter 30 is sufficiently restricted, so that a predetermined pressure differential is created from the annulus 26 to the flow passage 48. Pressure in the annulus 26 is communicated to the bypass flow path 70 via the filter 36 and the annulus 56. Thus, the pressure differential from the annulus 26 to the flow passage 48 is applied across the closure member 64.

When the pressure differential reaches the predetermined level, it overcomes a biasing force exerted by the bias member 66 and the closure member 64 displaces upward (as viewed in FIG. 5). This unblocks the bypass flow path 70, so that the fluid 22 can flow from the bypass flow path into the flow passage 48 for production to the surface via the tubular string 20.

The bottom hole assembly 12, thus, includes features that solve many of the issues or problems encountered in hydrocarbon well production. The bottom hole assembly 12 provides a three-stage assembly and method to protect valuable well equipment and extend run-time between well workovers.

The bottom hole assembly 12 provides multiple tools in a compact, cost effective package. The bottom hole assembly 12 can accomplish desired results with a compact assembled length.

The bottom hole assembly 12 incorporates a wire screen jacket or other type of filter 30 to filter out the bulk of sand and other solid materials and prevent their intake into the pump 28. This offers a first stage of protection for the well components.

The second stage of well protection is through use of micro-encapsulated, solid chemical sticks or other chemical treatment 34. The solid stick chemical may be formulated using different chemicals to alleviate specific problems in the well. The solid stick is preferably water soluble and slowly disperses into the wellbore fluid 22 to provide chemical treatment. In some examples, the treatment can last from several months to over a year depending on well conditions.

The third stage of well protection is provided by the bypass valve 60 of the bottom hole assembly 12. Like any filter which separates out solid material, the filter 30 may eventually become clogged to the point of constricting fluid 22 flow through the filter.

The filter bypass tool 38 allows the well to continue to operate without filtration, in order to extend a run-time of the well. Once a predetermined pressure differential is reached due to reduced flow through the filter 30, the bypass valve 60 opens, and flow is then permitted through a separate intake section with larger screen openings (e.g., in the filter 36). In this manner, the well continues to produce.

In an example representatively illustrated in the drawings, the bottom hole assembly 12 comprises the base pipe 58. The filter 30 (such as, a larger diameter columnar vee wire screen jacket) is placed over a non-perforated section of the inner tubular 40 and attached to the pipe 58, for example, using a screen spacer end ring and weld ring. At or near a lower end of the inner tubular 40 there are perforations covered by the filter 32 (such as, a section of smaller diameter vee wire columnar screen jacket).

The chemical treatment 34 (such as, micro-encapsulated, solid chemical sticks) is inserted into the inner tubular 40. Different recipes of the chemical treatment 34 can be used to solve specific problems of individual wells. The perforated section of the inner tubular 40 allows the chemical treatment 34 to dissolve and slowly be dispersed into the well fluid 22. The filter 32 covering these perforations controls the rate of release of the dissolved chemical treatment 34. The openings in the filter 32 and inner tubular 40 (such as, slots) may be adjusted to provide a higher or lower rate of dispersion. A bull plug 42 is installed into a lower collar 76 (see FIG. 2) below the perforated section of the inner tubular 40 to seal the solid chemical treatment 34 within the inner tubular.

An annulus 46 between the pipe 44 and the inner tubular 40 forms an intake path for well fluids 22. Screen spacers (not shown) can serve to centralize the filter 30 and pipe 44 around the inner tubular 40, thereby providing open area in the annulus 46 for optimum fluid 22 flow. The fluid 22 enters through filter 30 and pipe 44 openings or slots and then travels through the annulus 46, through openings in the screen spacers, up through the flow adapter 52 and into the inner tube 50. Fluid 22 continues to an inlet of the pump 28 and is produced through the tubular string 20 to the surface.

The filter bypass tool 38 can include a length of perforated pipe 58 with a filter 36 (such as, a section of columnar vee wire) covering the perforated section and attached with the use of cast weld rings. This filter 36 preferably has larger openings than the filter 30, for example, 0.075" (or 75 slot), and filters only large particulates, providing relatively little or no restriction to fluid 22 flow. The outer housing 62 containing the bypass valve 60 is connected to an upper end of the pipe 58.

The spring retainer 72 is held in place within the outer housing 62 with the snap ring 74. The bias member 66 is positioned between the closure member 64 and the retainer 72. As a pressure differential from the bypass flow path 70 to the flow passage 48 overpowers the bias member 66, the valve 60 opens, allowing relatively unrestricted fluid 22 flow into the flow passage 48.

Components making up the bottom hole assembly 12 may be of varying lengths, diameters and slot sizes to accommodate well conditions and equipment configurations downhole. Bias member 66 compression may be varied to adjust the pressure differential required for the bypass valve 60 to open. Columnar vee wire screen jacket may be attached using various means, including welding directly to the pipe or tubing, use of epoxy, polymers, crimping and other means.

The above disclosure provides to the art a filter bypass tool 38 for use in a subterranean well. In one example, the filter bypass tool 38 includes an inner tube 50 having a flow passage 48 extending longitudinally through the inner tube 50, a pipe 58 surrounding the inner tube 50, with an annulus 56 formed radially between the pipe 58 and the inner tube 50. The pipe 58 is perforated to permit fluid communication between the annulus 56 and an exterior of the pipe 58 (e.g., corresponding to the annulus 26 in the FIG. 1 system 10).

The filter bypass tool 38 further includes a bypass valve 60 having closed and open configurations. In the closed configuration, the bypass valve 60 blocks fluid 22 flow from the annulus 56 to the flow passage 48. In the open configuration, the bypass valve 60 permits fluid 22 flow from the annulus 56 to the flow passage 48. The bypass valve 60 is configured to open in response to a predetermined pressure differential from the annulus 56 to the flow passage 48.

The filter bypass tool 38 may include a filter 36 surrounding the pipe 58 to filter fluid 22 flow between the exterior of the pipe 58 and the annulus 56.

The bypass valve 60 may include a bypass flow path 70 in communication with the annulus 56, and an annular shaped closure member 64 that blocks flow through the bypass flow path 70 in the closed configuration.

The bypass valve 60 may include a bias member 66 that biases the closure member 64 toward a position in which the closure member 64 blocks the flow through the bypass flow path 70. The bias member 66 may comprise a compression spring.

The filter bypass tool 38 may include an outer housing 62. The bypass valve 60 may be positioned in the outer housing 62.

The bypass valve 60 may include a bypass flow path 70 in communication with the annulus 56, and the bypass flow path 70 may be formed in a sleeve 64 received in the outer housing 62. The inner tube 50 may be received in the sleeve 64.

The pipe 58 may be received in the outer housing 62. The outer housing 62 may be configured to connect to an inlet of a downhole pump 28.

A system 10 for use with a subterranean well is also described above. In one example, the system 10 can include a bottom hole assembly 12 comprising: a first filter 30 configured to filter flow between an exterior of the first filter 30 (e.g., corresponding to the annulus 26) and an inner flow passage 48, and a bypass valve 60 having closed and open configurations.

In the closed configuration, the bypass valve 60 blocks fluid 22 flow from the exterior of the first filter 30 to the inner flow passage 48 through the bypass valve 60. In the open configuration, the bypass valve 60 permits fluid 22 flow from the exterior of the first filter 30 to the inner flow passage 48 through the bypass valve 60. The bypass valve 60 is configured to open in response to a predetermined pressure differential from the exterior of the first filter 30 to the inner flow passage 48.

The bottom hole assembly 12 may include an inner tubular 40 positioned within the first filter 30, and a solid chemical treatment 34 positioned within the inner tubular 40.

The bottom hole assembly 12 may include a second filter 32 configured to filter flow between an interior of the inner tubular 40 and the exterior of the first filter 30.

The bottom hole assembly 12 may include a flow adapter 52 connected between the first filter 30 and the bypass valve 60, the flow adapter having at least one port 54 that permits fluid communication between a) an annulus 46 formed between the first filter 30 and the inner tubular 40, and b) the flow passage 48 extending through an inner tube 50 connected between the flow adapter 52 and the bypass valve 60.

The bottom hole assembly 12 may include a third filter 36 configured to filter flow between the exterior of the first filter 30 and an annulus 56 formed between the third filter 36 and the inner tube 50. The annulus 56 may be in communication with the bypass valve 60. The bypass valve 60 may permit flow from the annulus 56 to the flow passage 48 in the open configuration.

The bypass valve 60 may include a bypass flow path 70 in communication with an annulus 56 surrounding an inner tube 50, and an annular shaped closure member 64 that blocks flow through the bypass flow path 70 in the closed configuration.

The bypass valve 60 may include a bias member 66 that biases the closure member 64 toward a position in which the closure member 64 blocks the flow through the bypass flow path 70.

The system 10 may include an outer housing 62, with the bypass valve 60 being positioned in the outer housing 62. The bypass flow path 70 may be formed in a sleeve 68 received in the outer housing 62.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A filter bypass tool for use in a subterranean well, the filter bypass tool comprising:
    an inner tube having a flow passage extending longitudinally through the inner tube;
    a pipe surrounding the inner tube, with an annulus formed radially between the pipe and the inner tube, the pipe being perforated to permit fluid communication between the annulus and an exterior of the pipe; and
    a bypass valve having closed and open configurations, in the closed configuration the bypass valve blocks fluid flow from the annulus to the flow passage, in the open configuration the bypass valve permits fluid flow from the annulus to the flow passage, and the bypass valve is configured to open in response to A pressure in the annulus being greater than a pressure in the flow passage by a predetermined amount an outer housing, the bypass valve being positioned in the outer housing in which the bypass valve comprises a bypass flow path in communication with the annulus, and the bypass flow path is formed in a sleeve received in the outer housing.

2. The filter bypass tool of claim 1, further comprising a filter surrounding the pipe to filter fluid flow between the exterior of the pipe and the annulus.

3. The filter bypass tool of claim 1, in which the bypass valve comprises a bypass flow path in communication with the annulus, and an annular shaped closure member that blocks flow through the bypass flow path in the closed configuration.

4. The filter bypass tool of claim 3, in which the bypass valve further comprises a bias member that biases the closure member toward a position in which the closure member blocks the flow through the bypass flow path.

5. The filter bypass tool of claim 4, in which the bias member comprises a compression spring.

6. The filter bypass tool of claim 1, in which the inner tube is received in the sleeve.

7. The filter bypass tool of claim 1, in which the pipe is received in the outer housing.

8. The filter bypass tool of claim 7, in which the outer housing is configured to connect to an inlet of a downhole pump.

\* \* \* \* \*